May 15, 1956 L. J. BOBB 2,745,905

MAGNETIC HEAD ASSEMBLY

Filed Jan. 14, 1949

Lloyd J. Bobb Inventor

By Synnestvedt & Lechner

Attorneys

United States Patent Office 2,745,905

Patented May 15, 1956

2,745,905

MAGNETIC HEAD ASSEMBLY

Lloyd J. Bobb, Glenside, Pa., assignor to The International Electronics Company, Philadelphia, Pa., a corporation of Pennsylvania Application January 14, 1949, Serial No. 70,837

7 Claims. (Cl. 179—100.2)

This invention relates to magnetic head assemblies for use in magnetic recording and reproducing apparatus.

The invention is particularly concerned with magnetic recording, reproducing and erasing head assemblies, for example, of the general type disclosed in my copending application, Serial No. 777,677, that is to say, heads which are assembled from identical laminae to form a lamination symmetrical about a translating flux gap.

I have found that the pole pieces of magnetic heads which scan a magnetic record while in actual physical contact therewith are subject, over a period of time, to considerable wear. As the metal of the pole pieces wears away, the magnetic characteristics of the gap undergo changes as compared with the characteristics of a new head, and, if such wear continues, the characteristics of the gap may change so completely as to require the substitution of a new head for the worn head.

I have also found that in recording or reproducing heads comprising laminations which are asymmetrical about even one plane, and which therefore necessarily involve the asymmetrical location of the head windings with respect to at least one plane, difficulties are occasionally encountered in balancing the susceptibility of the windings to the influence of external electromagnetic fields, with the result that a hum or noise voltage representing the unbalance may appear at the terminals of the head and be amplified along with the signal being reproduced. The same condition can lead to the recording of hum and related disturbances when such a head is being used for recording.

Beyond the foregoing, I have found that for optimum operation of magnetic recording and reproducing equipment, particularly where magnetic records recorded on one apparatus are intended to be reproduced by another apparatus, it is essential to provide for extremely accurate orientation of the head relative to a record being scanned thereby, both as regards the alignment of the recording pole pieces with the record track and with regard to the angular orientation of the head of one machine with the head of another machine which is intended to be used interchangeably with the same record or records. Such accuracy of orientation is most difficult to attain with head assemblies and head mounting structures of the prior art.

It is a general object of the present invention to provide a magnetic head assembly which overcomes one or more of the difficulties outlined above.

It is another object of the invention to provide a magnetic head having two translating flux gaps so arranged that one of the gaps may be used after the pole pieces surrounding the other gap have become so worn as to render it unsatisfactory in recording, reproducing or erasing, and thus to extend the useful life of the head.

It is a further object of the invention to provide a magnetic head which is symmetrical about three planes, whereby to provide for simplicity of conversion from one flux gap to another; and, moreover, to provide a magnetic head in which the two flux gaps both lie in a plane of symmetry of the magnetic head whereby to further simplify the adjustment of the head from a position in which one gap is operative to a position in which the other gap is operative.

Beyond the foregoing, the invention contemplates a symmetrical arrangement of laminations and windings wherein the effects of external magnetic fields may easily be balanced as between the two windings.

The invention also contemplates novel means of securing a magnetic head to a head support in a manner to provide for simplicity of adjustment of the position of the head relative to the record being scanned.

Finally, the invention contemplates a magnetic head structure achieving one or more of the objectives hereinabove recited and further embodying a core half member so proportioned in plan as to receive a prewound coil assembly and thus obviate the necessity for winding the coil on the lamination.

How these objects and others which will appear are attained will be apparent upon consideration of the detailed description of the invention which is contained hereinbelow and the drawings, in which.

The magnetic head assembly of the invention comprises eight major parts, namely, a pair of symmetrical identical lamination halves A, a pair of identical winding assemblies B, an upper clamp C, a lower clamp D, a terminal strip E, and a mounting fixture F.

Figures 1, 2, 5:
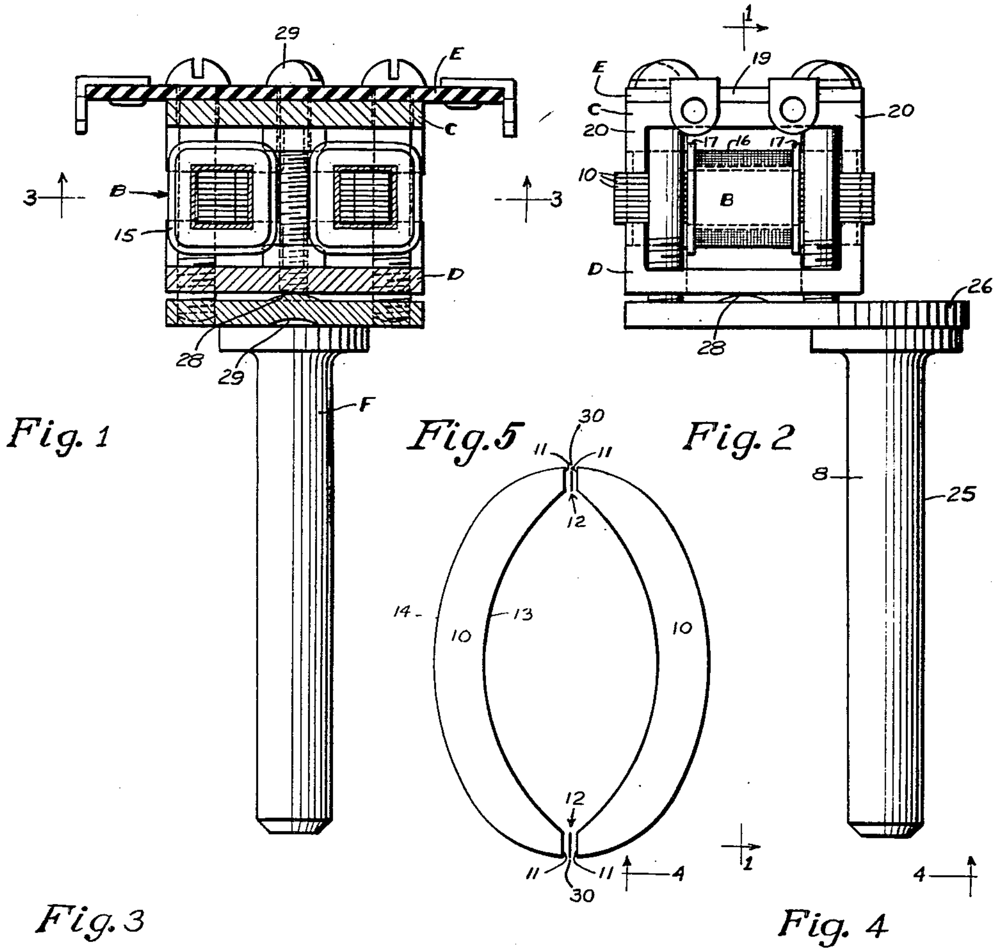
Figure 1 is a vertical sectional view on an enlarged scale through the magnetic head assembly of the invention taken as indicated by the line 1—1 in Figure 2.
Figure 2 is a side elevation of the assembly of Figure 1.
Figure 5 is a plan view, on a still larger scale, of a pair of laminar half-members in exaggerated spaced-apart relationship.

Each lamination half A consists of a stack of laminar half members 10 whose symmetrical plan form may best be seen in Figure 5. The number of such members 10 in a stack depends upon the desired magnetic properties of the finished head; for example, in the head illustrated in the drawings, which is intended primarily for erasing magnetic records, I employ nine members 10 to make up each half of the lamination. In heads which are intended for other functions, either more or fewer members 10 may be employed.

Each member 10, and accordingly each lamination half A, is characterized by a pair of end surfaces 11 adapted to define, in cooperation with the corresponding surfaces of the other lamination half, a flux gap 12 at each end of the lamination. The surfaces 11 lie in the plane of symmetry of the members 10, and, accordingly, the completed lamination is characterized by a pair of similar flux gaps lying in a common plane.

The portion of each member 10 lying between the end surfaces 11 is defined by a generally arcuate inner surface 13 and an outer surface 14, the surfaces 13 and 14 being substantially concentric in the median or coil-supporting portion of the member 10, and approaching one another in the region of the flux gaps. Each surface is uninterrupted from its intersection with the gap face at one end to its intersection with the gap face at the other end of the lamination. Rather generally stated, the lamination thus formed is roughly elliptical in shape and is characterized by a flux gap at each end, lying on the the major axis of the ellipse. Geometrically speaking, the inner surface 13 may desirably take the form of an arc of a circle, and the median portion of the outer surface 14 may also be an arc of a circle having the same center as the surface 13, while the end portions of the surface 14 are defined by arcs having somewhat smaller radii. When a pair of such lamination assemblies are placed in juxtaposition, with their surfaces 11 in spaced apart parallel relationship, the result is a lamination symmetrical about three axes and provided with a pair of identical flux gaps and with a pair of identical coil-supporting portions, each of which is magnetically and physically related to each flux gap in the same manner.

Each winding assembly B comprises a coil form 15 comprising a rectangular body 16 and a pair of end flanges 17. Body 16 is proportioned to receive the thickness of the lamination stack, and its length and width are so related that while it may be slipped over the end of a lamination stack, it will engage the curved coil-supporting portion of the lamination with suitable snugness. According to the invention, a coil 18 is wound on each form 15 prior to assembly on the laminations.

Figure 3:
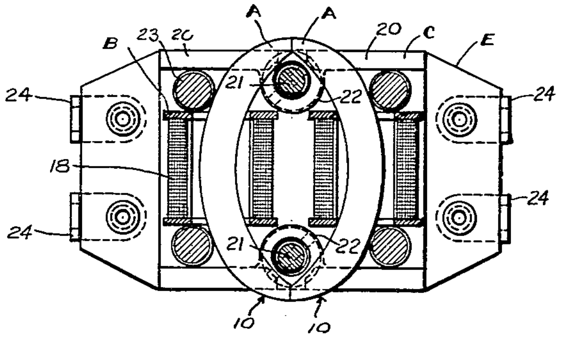
Figure 3 is a horizontal sectional view taken from below as indicated by the line 3—3 in Figure 1.
Figure 4:
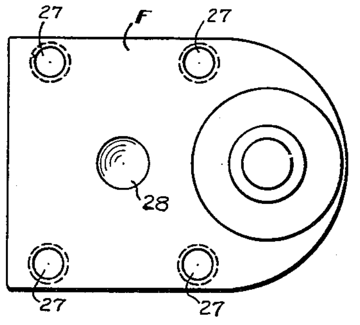
Figure 4 is a plan view of the bottom of the head assembly taken as indicated by the line 4—4 in Figure 2.

Clamps C and D are generally C-shaped in section, as may best be seen from Figure 2, comprising a body 19 and jaws 20 adapted to engage the laminations near the flux gaps, as may be seen in Figure 3, and are further characterized by holes 21 reinforced by flanges 22 and adapted to receive clamping screws, as will appear, and holes 23 which are adapted to receive mounting screws, as will also appear. Clamps C and D are identical, with the exception that the apertures 21 in lower clamp D are tapped to receive the clamping screws above referred to.

Clamps C and D are preferably formed by diecasting from non-magnetic material, which may be metallic, i. e., white metal or aluminum; or resinous, for example, phenol formaldehyde.

Terminal strip E, which may be formed of any convenient dielectric material, is approximately equal in width to clamp C but is appreciably longer and carries soldering lugs 24 at either end in positions out of contact with clamp C. In addition, terminal strip E is pierced by six holes adapted to be aligned with holes 21 and 23 in clamps C and D.

Mounting fixture F consists of a shouldered shank 25, welded or otherwise secured to a base plate 26. Base plate 26 is characterized by four tapped holes 27 adapted to be aligned with holes 23 of clamps C and D and by a raised hump 28 centrally located with respect to holes 27. Hump 28 is formed by inverting plate 26 and striking the plate with a pointed tool to produce a dimple 29 (see Figure 1) on the lower side and the hump 28 on the upper side.

While the several elements hereinabove described lend themselves to assembly in a number of different ways, I have found that the following procedure is most desirable:

The lamination halves A are formed by inserting the desired number of laminar half members 10 in a fixture comprising a trough whose inner surface is congruent with the convex outer surface of the half members 10. The members 10 are pressed into approximate position with the fingers and axial pressure applied thereto with a clamp. The members 10 are then secured to one another in the clamped position by applying a small amount of solder.

A plurality of lamination halves so formed are then placed side by side in another fixture comprising a trough similar to the fixture above mentioned but long enough to accommodate several lamination halves and shallow enough to expose the end surfaces 11. The end surfaces 11 are then polished to provide flat, coplanar gap-defining surfaces by inverting the fixture containing the lamination halves over a plate upon which has been spread a quantity of abrasive material. The fixture with the surfaces 10 against the abrasive carrying plate is then moved relative to the plate to accomplish the actual grinding operation.

The actual assembly of the head is carried out with the assistance of a third fixture consisting of a steel block on whose upper surface are mounted a pair of vertical pins adapted to engage a pair of holes 23 in clamps C and D, for example, the two holes 23 at the upper end of Figure 3. The assembly is commenced by dropping a bottom clamp D over the pins with the jaws 20 facing upwardly.

A winding assembly B is now slipped over each of a pair of lamination halves A, and the lamination halves, each bearing its winding, are dropped into position on the clamp D.

The top clamp C with the jaws 20 facing downwardly is now dropped into position with the pins engaging the holes 23, as in the case of clamp D. The terminal panel E is then dropped into position and the clamping screws 29 are dropped into the holes 21 and started.

A brass shim 30 is then inserted between the opposing faces of the lamination halves at each end of the lamination.

The various parts are now approximately positioned by hand and pressure is then applied to the end of the lamination opposite the end adjacent the pins, thus pressing the pole pieces between the pins and forcing the lamination halves toward one another.

The coil leads are now soldered to the lugs on the terminal plate.

The head is next transferred to a test stand where it is subjected to the influence of an extraneous magnetic field of audible frequency, and the head is connected to a sound reproducing device. The relative positions of the two lamination halves are then adjusted for minimum audible response by shifting one lamination half relative to the other in a direction along the major axis of the lamination. When this condition has been attained, the clamping screws 29 are tightened.

The pole pieces are then polished by urging the ends of the lamination against a moving belt carrying abrasive material.

Finally, the head is secured to the mounting fixture by means of screws 30 which are dropped through holes 23 in clamps C and D and then started in holes 27 in base plate 26.

When the head assembly has been mounted in the magnetic recording apparatus by means of shank 25 and is ready for final alignment, a standard record is inserted in the machine, the machine is adjusted for reproducing, and screws 30 are tightened or loosened as the case may be, rocking the head on hump 28 until the maximum signal is obtained. When the longitudinal axis of the tape is perpendicular to the plane of the flux gap, this may most conveniently be done by first rocking the head in the plane of Figure 2 until the maximum signal is picked up from the record, thus indicating that correct vertical alignment has been made, and then rocking the head in the plane of Figure 1 until maximum high frequency response is obtained. Since the reproduction of high frequencies is rather critical with respect to the angular orientation of the head, this operation results in the optimum angular orientation for reproduction.

According to the procedure outlined above, the adaptability of the magnetic head of the present invention to mass production is thoroughly exploited and the assembly of the head itself is coordinated with the assembly and alignment of the complete magnetic recording and reproducing apparatus.

The structural characteristics of the head may be summed up by pointing again to the fact that each of the laminar half members is symmetrical and that the lamination formed by assembling pairs of such members is characterized by a pair of flux gaps lying in a common plane at opposite ends of the lamination, that the lamination is characterized by a plan form lending itself to assembly with prewound coils, that the coils as well as the laminations are symmetrical, and that the complete head assembly, which is also symmetrical in three planes, is secured to the mounting fixture in a manner to provide for universal adjustment of the position of the gap and its angular orientation within a range adequate for aligning the head relative to a standard record.

Thus, according to the invention, the completed head is characterized by physical, magnetic, and electrical symmetry about three axes. As a result of this construction, the flux gap at either end of the head may be employed in recording or reproducing, extending the useful life of the head.

In addition, the symmetrical arrangement of the various parts of the head reduces the response of the head to extraneous electrostatic and magnetic fields by virtue of the fact that the voltages induced in one winding by such fields are opposed to the voltages induced in the other winding.

The generally arcuate shape of the core half members permits the use of prewound coils, with the advantages pointed out in my copending application hereinabove identified. It should be mentioned that wherever herein the core half members are referred to as being "arcuate," and wherever the lamination is referred to as being "elliptical," these terms are used in a general rather than in a geometrically precise sense, for, as has been pointed out in the detailed description, the preferred form of the invention involves departures from strictly arcuate or strictly elliptical form.

I claim:

1. A generally arcuate core half-member for a magnetic head characterized in plan by a pair of end edges lying in a common plane, a concave edge intersecting said end edges, and a convex edge intersecting each of said end edges at a point outwardly from the intersection of said end edges with said concave edge, the concave edge being defined by an arc of a circle, the central portion of the convex edge being defined by an arc of a circle having the same center as said first circle, and the portions of said convex edge adjoining said end edges being defined by arcs of circles having shorter radii than the radius of said first-mentioned circle.

2. A magnetic scanning head for equipment adapted to be used with magnetic records, said head comprising a generally elliptical magnetic core structure divided on the major axis of the ellipse into a pair of core members each of which constitutes one-half of the elliptical core, said core members being assembled to provide a flux gap at at least one end of the ellipse, and the adjacent end portions of the core members at one end of the ellipse being of progressively decreasing width toward that end of the ellipse.

3. A magnetic scanning head in accordance with claim 2, which is substantially symmetrical about both the major and minor axes of the ellipse, each core member having in the region midway between its ends a central core portion of arcuate shape, and a pair of coils one mounted on each core member, the coil on each core member surrounding the central core portion thereof and being positioned symmetrically with respect to both the major and minor axes of the elliptical core.

4. A magnetic scanning head in accordance with claim 2 and further having prewound coils centrally located on each of the core members, the bore of each coil being generally rectangular and having a dimension in the direction perpendicular to the plane of the ellipse of the core assembly approximating the thickness of the associated core member so that the coil closely fits the side faces of the core member, and the bore of each coil having a dimension in the plane of the ellipse of the core assembly substantially greater than the transverse dimension of the end portions of the core member in the plane of the ellipse so that the coil may be assembled with the core member by endwise telescopic movement of the core member and coil.

5. A construction according to claim 4 in which the outer edge surfaces of the end portions of the core assembly are arcuate.

6. A magnetic scanning head in accordance with claim 2 and further having counterpart prewound coils assembled on each of the core members and positioned centrally thereof on parallel axes, the bore of each coil having a dimension in the plane of the ellipse of the core assembly substantially greater than the transverse dimension of the end portions of the core member in the plane of the ellipse so that the coil may be assembled with the core member by endwise telescopic movement of the core member and coil, and the assembly of core members and coils being symmetrical about both the major and minor axes of the ellipse of the core.

7. A magnetic scanning head in accordance with claim 2 and further having prewound coils assembled on each of the core members and positioned centrally thereof on parallel axes, the coil on each core member being a physical and electrical counterpart of the coil on the other core member, the bore of each coil having a dimension in the plane of the ellipse of the core assembly substantially greater than the transverse dimension of the end portions of the core member in the plane of the ellipse so that the coil may be assembled with the core member by endwise telescopic movement of the core member and coil, and the assembly of core members and coils being symmetrical with reference to the mean plane of the core and being symmetrical with reference to planes perpendicular to said mean plane and respectively containing the major and minor axes of the ellipse of the core.

References Cited in the file of this patent

UNITED STATES PATENTS

| | | |
|---|---|---|
| 1,254,664 | Downes | Jan. 29, 1918 |
| 1,828,190 | Kiliani | Oct. 20, 1931 |
| 2,020,211 | Quam | Nov. 5, 1935 |
| 2,483,123 | Clapp | Sept. 27, 1949 |
| 2,484,097 | Keller | Oct. 11, 1949 |
| 2,493,742 | Begun | Jan. 10, 1950 |
| 2,508,485 | Begun | May 23, 1950 |
| 2,513,617 | Begun | July 4, 1950 |
| 2,513,653 | Kornei | July 4, 1950 |
| 2,555,110 | Bobb | May 29, 1951 |
| 2,587,097 | Berlant | Feb. 26, 1952 |

FOREIGN PATENTS

| | | |
|---|---|---|
| 221,638 | Switzerland | Sept. 1, 1942 |
| 676,810 | Germany | June 12, 1939 |
| 725,830 | Germany | Sept. 30, 1942 |